(12) United States Patent
Nogawa (10) Patent No.: US 7,779,102 B2
(45) Date of Patent: Aug. 17, 2010

(54) MANAGEMENT DEVICE, NETWORK SYSTEM AND CONTROL PROGRAM THEREFOR

(75) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 552 days.

(21) Appl. No.: 11/550,676

(22) Filed: Oct. 18, 2006

(65) Prior Publication Data

US 2007/0124444 A1 May 31, 2007

(30) Foreign Application Priority Data

Oct. 19, 2005 (JP) .............................. 2005-304254

(51) Int. Cl.
*G06F 15/173* (2006.01)
(52) U.S. Cl. ..................................................... 709/223
(58) Field of Classification Search .................. 709/223
See application file for complete search history.

(56) References Cited

U.S. PATENT DOCUMENTS

| 7,392,327 | B2 * | 6/2008 | Kojima et al. ............... 709/248 |
| 2005/0007995 | A1 | 1/2005 | Inoue et al. |
| 2005/0197121 | A1 * | 9/2005 | Fujiwara et al. .......... 455/435.1 |
| 2006/0200857 | A1 * | 9/2006 | Yokota .......................... 726/6 |

FOREIGN PATENT DOCUMENTS

| JP | 199636475 A | 2/1996 |
| JP | H08-139741 A | 5/1996 |
| JP | 1996314651 A | 11/1996 |
| JP | 200078342 A | 3/2000 |
| JP | 2005-033374 A | 2/2005 |
| JP | 2005-130282 A | 5/2005 |
| JP | 2005-229332 A | 8/2005 |

OTHER PUBLICATIONS

Japan Patent Office, Notification of Reasons of Rejection in Japanese Patent Application No. 2005-304254 (counterpart to the above-captioned U.S. Patent Application) mailed Feb. 16, 2009.

* cited by examiner

*Primary Examiner*—Wing F Chan
*Assistant Examiner*—Tesfay Yohannes
(74) *Attorney, Agent, or Firm*—Baker Botts, LLP.

(57) ABSTRACT

A managing device includes an identification information requesting unit that requests each network interface for the identification information of all the network interfaces belonging to the image forming device via the network, and an identification information receiving unit that receives reply information from the each network interface in response to the identification information request. When the identification information receiving unit receives a plurality of pieces of the identification information, an identification information equivalency judging unit judges whether a combination of the plurality of pieces of the identification information received from one of the plurality of network interfaces is identical to another combination of the plurality of pieces of the identification information received from another of the plurality of network interfaces. When the combinations are determined to be identical to each other, a managing unit manages the network interfaces as ones belonging to the same image forming device.

7 Claims, 12 Drawing Sheets

FIRST MAC ADDRESS REQUEST

|  | FIRST MAC ADDRESS |
|---|---|
| INTERFACE 1 | 001122334455 |
| INTERFACE 2 | 001122334455 |

FIG.6B

SECOND MAC ADDRESS REQUEST

|  | FIRST MAC ADDRESS | SECOND MAC ADDRESS |
|---|---|---|
| INTERFACE 1 | 001122334455 | 001122334456 |
| INTERFACE 2 | 001122334455 | 001122334456 |

FIG.7A

FIRST MAC ADDRESS REQUEST

|  | FIRST MAC ADDRESS |
|---|---|
| INTERFACE 1 | 001122334455 |
| INTERFACE 2 | 001122334456 |

FIG.7B

SECOND MAC ADDRESS REQUEST

|  | FIRST MAC ADDRESS | SECOND MAC ADDRESS |
|---|---|---|
| INTERFACE 1 | 001122334455 | 001122334456 |
| INTERFACE 2 | 001122334456 | 001122334455 |

| | FIRST MAC ADDRESS | SECOND MAC ADDRESS | |
|---|---|---|---|
| INTERFACE 1 OF DEVICE 10a | 001122334455 | 001122334456 | ← RECORD A |
| INTERFACE 2 OF DEVICE 10a | 001122334456 | 001122334455 | ← RECORD B |
| INTERFACE 1 OF DEVICE 10b | 001122334457 | 001122334458 | ← RECORD C |
| INTERFACE 2 OF DEVICE 10b | 001122334458 | 001122334457 | ← RECORD D |
| INTERFACE 1 OF DEVICE 10c | 001122334459 | — | ← RECORD E |

| Node Name | Node Address | Printer Status | Printer Type | Node Type | Location | Node Firmwar... | Contact |
|---|---|---|---|---|---|---|---|
| B.200000 | 192.168.0.1 | SLEEP | B H-8050N series | NC-5200h(type 1) | | 1.00 | |
| B.200001 | 192.168.0.2 | 07/14/2005 09:40... | B FC-8820D | NC-9100h | | 1.01 | |
| B.200002 | 192.168.0.3 | 07/14/2005 09:40... | B FC-8820D | NC-7100w | | 1.00 | |
| B.200003 | 192.168.0.4 | Check Paper #1 ... | B FC-8820D | NC-9100h | | 1.07 | |
| B.200004 | 192.168.0.5 | SLEEP | B L-1651 1670N sar... | NC-4100h(type 1) | | | |
| B.200005 | 192.168.0.6 | 07/14/2005 09:40... | B L-8040X | NC-9100h | | 1.00 | |
| B.200006 | 192.168.0.7 | 07/14/2005 09:40... | B L-8040X | NC-7100w | | 1.00 | |

Devices:5  Unconfigured:0

FIG.11A

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B 200001 | 192.168.0.2 | 07/14/2005 09:40 | B FC-8820D | NC-9100h | | 1.01 | |
| B 200003 | 192.168.0.4 | Check Paper #1 ... | B FC-8820D | NC-9100h | | 1.00 | |
| B 200004 | 192.168.0.5 | SLEEP | B L-1651_1670N sar... | NC-4100h(type 1) | | 1.07 | |
| B 200005 | 192.168.0.6 | 07/14/2005 09:40 | B L-9040X | NC-9100h | | 1.00 | |

Devices:5  Unconfigured:0

FIG.11B

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B 200001 | 192.168.0.2 | 07/14/2005 09:40 | B FC-8820D | NC-9100h | | 1.01 | |
| B 200002 | 192.168.0.3 | 07/14/2005 09:40 | B FC-8820D | NC-7100w | | 1.01 | |
| B 200003 | 192.168.0.4 | Check Paper #1 ... | B FC-8820D | NC-9100h | | 1.00 | |
| B 200004 | 192.168.0.5 | SLEEP | B L-1651_1670N sar... | NC-4100h(type 1) | | 1.07 | |
| B 200005 | 192.168.0.6 | 07/14/2005 09:40 | B L-9040X | NC-9100h | | 1.00 | |

Devices:5  Unconfigured:0

FIG.12A

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B.200001 | 192.168.0.2 | 07/14/2005 09:40 | B FC-8820D | NC-9100h | | 1.01 | |
| B.200003 | 192.168.0.4 | Check Paper #1 ... | B FC-8820D | NC-9100h | | 1.00 | |
| B.200004 | 192.168.0.5 | SLEEP | B L-1651_1670N sar... | NC-4100h(type 1) | | 1.07 | |
| B.200005 | 192.168.0.6 | 07/14/2005 09:40 | B L-8040X | NC-9100h | | 1.00 | |

Devices:5  Unconfigured:0

FIG.12B

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B.200002 | 192.168.0.3 | 07/14/2005 09:40 | B FC-8820D | NC-7100w | | 1.01 | |
| B.200003 | 192.168.0.4 | Check Paper #1 ... | B FC-8820D | NC-9100h | | 1.00 | |
| B.200004 | 192.168.0.5 | SLEEP | B L-1651_1670N sar... | NC-4100h(type 1) | | 1.07 | |
| B.200005 | 192.168.0.6 | 07/14/2005 09:40 | B L-8040X | NC-9100h | | 1.00 | |

Devices:5  Unconfigured:0

FIG.13

MANAGEMENT DEVICE, NETWORK SYSTEM AND CONTROL PROGRAM THEREFOR

CROSS-REFERENCE TO RELATED APPLICATION

This application claims priority under 35 U.S.C. §119 from Japanese Patent Application No. 2005-304254, filed on Oct. 19, 2005. The entire subject matter of the application is incorporated herein by reference.

BACKGROUND OF THE INVENTION

1. Technical Field

The present invention relates to a management device, a network system and a control program from the management device.

2. Related Art

Conventionally, image forming devices such as a printer are shared by a plurality of host computers connected through a network. An example of such an image forming device is disclosed in Japanese Patent Provisional Publication No. HEI 8-314651 (hereinafter, referred to as '651 publication). In some cases, a plurality of the image forming devices (e.g., printers) as above are connected to the network. Therefore, in order to use the image forming devices through the network, it is necessary to collectively mange the image forming devices. That is, operational statuses and/or parameter setting information of the image forming devices connected to the network should be centrally managed. It is particularly important to manage the image forming device when a plurality of image forming devices are connected to the network. Therefore, recently, applications for centralized management of the operational statuses and/or operational statuses of the image forming devices have been suggested and widely used.

Recently, there are image forming devices provided with a plurality of network interfaces. When a management device obtains management information regarding the network interfaces of each image forming device, the management device typically transmits a request for the management information for each network interface through the network. Then, in response to the request, the information for each network is transmitted from each image forming device. Thus, information is collected in the management device in a unit of each network interface.

SUMMARY OF THE INVENTION

Aspects of the invention are advantageous in that, even a plurality of network interfaces are implemented in a single image forming device, they can be integrally managed as interfaces of the same image forming device.

DESCRIPTION

General Overview

According to aspects of the invention, there is provided a managing device connected to an image forming device through a network, the image forming device being provided with a plurality of network interfaces to which identification information intrinsic to each of the plurality of network interfaces is assigned. The managing device is provided with an identification information requesting unit configured to request each of the plurality of network interfaces for the identification information of all the network interfaces belonging to the image forming device via the network, an identification information receiving unit configured to receive reply information transmitted from the each of the plurality of network interfaces in response to the identification information request, an identification information unit configured such that, when the identification information receiving unit receives a plurality of pieces of the identification information on the plurality of network interfaces from each of the plurality of network interfaces, the identification information equivalency judging unit judges whether a combination of the plurality of pieces of the identification information received from one of the plurality of network interfaces is identical to another combination of the plurality of pieces of the identification information received from another of the plurality of network interfaces, and a managing unit configured such that, when the identification information equivalency judging unit determines that the combination of the plurality of pieces of the identification information received from one of the plurality of network interfaces is identical to another combination of the plurality of pieces of the identification information received from another of the plurality of network interfaces, the managing unit manages the one of network interfaces and the other of the network interfaces as ones belonging to the same image forming device.

According to the above configuration, even when the image forming device is provided with a plurality of network interfaces, from each network interface, the identification information regarding all the network interfaces of the image forming device can be checked. For example, if the image forming device includes two network interfaces A and B, the identification information on the network interfaces A and B can be obtained from the network interface A. Similarly, the identification information on the network interfaces A and B can be obtained from the network interface A. The identification information equivalency judging unit judges whether a combination of the pieces of information obtained from the network interface A and a combination of the pieces of information obtained from the network interface B are identical. In this example, the combination of the identification information obtained from the network interface A (A and B) is equal to that obtained from the network interface B (B and A). Therefore, it is recognized that the network interfaces A and B are provided to the same image forming device.

According to the above configuration, it becomes possible that the managing device recognizes that the plurality of network interfaces are provided to the same image forming device. Therefore, when management information obtained from the network interfaces is displayed, the information related to the same image forming device can be handled integrally. For example, the management information regarding the network interface A is displayed in one line, and the management information regarding the network interface B is displayed also in one line and below the line indicating the information regarding the network interface A. In this manner, the management information regarding the same image forming device is displayed at close positions, management thereof becomes easy.

The identification information requesting unit may be configured to request the individual network interfaces for the identification information of the network interfaces belonging to the image forming device.

In one example, the identification information intrinsic to each network interface is a MAC (Media Access Control) address.

The managing device above may further include an identification information recognition unit configured to recognize the identification information on the network interface that transmits the identification information by discriminating the identification information on the network interface that transmits the identification information from the identification information on the other network interfaces provided to the image forming device. When the identification information equivalency judging unit determines that the combinations of the plurality of pieces of identification information are identical to each other, the managing unit may manage the one of network interfaces and the other of the network interfaces as ones belonging to the same image forming device. The managing device may recognize and manage the identification information on each network interface.

According to the above configuration, the managing device can recognize that a plurality of network interfaces belong to the same image forming device, and further the identification information on the respective network interfaces can be recognized.

According to aspects of the invention, there is provided a network system including an image forming device provided with a plurality of network interfaces respectively assigned with a plurality of pieces of identification information intrinsic to the plurality of network interfaces, respectively, and a managing device connected through a network. The image forming device comprises all identification information transmitting unit that transmits all the plurality of pieces of the identification information from one of the plurality of network interfaces when the managing device requests the one of the plurality of network interfaces to transmit the plurality of pieces of the identification information.

The managing device is provided with an identification information requesting unit configured to request each of the plurality of network interfaces for the identification information of all the network interfaces belonging to the image forming device via the network, an identification information receiving unit configured to receive reply information transmitted from the each of the plurality of network interfaces in response to the identification information request, an identification information equivalency judging unit configured such that, when the identification information receiving unit receives a plurality of pieces of the identification information on the plurality of network interfaces from each of the plurality of network interfaces, the identification information equivalency judging unit judges whether a combination of the plurality of pieces of the identification information received from one of the plurality of network interfaces is identical to another combination of the plurality of pieces of the identification information received from another of the plurality of network interfaces, and a managing unit configured such that, when the identification information equivalency judging unit determines that the combination of the plurality of pieces of the identification information received from one of the plurality of network interfaces is identical to another combination of the plurality of pieces of the identification information received from another of the plurality of network interfaces, the managing unit manages the one of network interfaces and the other of the network interfaces as ones belonging to the same image forming device.

According to the above network system, when the managing device requests one of the network interface among a plurality of the network interfaces belonging to the image forming device, the identification information regarding all the network interfaces of the image forming device can be transmitted from the all identification information transmitting unit. For example, when network interfaces A and B are provided to the image forming device, and if the request is made to the network interface A, the identification information for all the network interfaces (A and B) is transmitted individually from the network interface A. Alternatively, if the request is made to the network interface B, the identification information for all the network interfaces (A and B) is transmitted individually from the network interface B. The identification information equivalency judging unit judges whether a combination of the pieces of information obtained from the network interface A and a combination of the pieces of information obtained from the network interface B are identical. In this example, the combination of the identification information obtained from the network interface A (A and B) is equal to that obtained from the network interface B (B and A). Therefore, it is recognized that the network interfaces A and B are provided to the same image forming device.

The identification information transmitting unit may be configured to transmit the plurality of pieces of the identification information individually from the plurality of network interfaces, and the identification information requesting unit may be configured to request the individual network interfaces for the identification information of the network interfaces belonging to the image forming device.

According to aspects of the invention, there is provided a computer-accessible recording medium storing a program containing instructions that cause a computer to control a managing device connected to an image forming device through a network, the image forming device being provided with a plurality of network interfaces to which identification information intrinsic to each of the plurality of network interfaces is assigned. The program may include a computer executable instructions of requesting each of the plurality of network interfaces for the identification information of all the network interfaces belonging to the image forming device via the network, receiving reply information transmitted from the each of the plurality of network interfaces in response to the identification information request, judging, when the a plurality of pieces of the identification information on the plurality of network interfaces are received from each of the plurality of network interfaces, whether a combination of the plurality of pieces of the identification information received from one of the plurality of network interfaces is identical to another combination of the plurality of pieces of the identification information received from another of the plurality of network interfaces, and managing, when the combination of the plurality of pieces of the identification information received from one of the plurality of network interfaces is determined to be identical to another combination of the plurality of pieces of the identification information received from another of the plurality of network interfaces, the one of network interfaces and the other of the network interfaces as ones belonging to the same image forming device.

According to aspects of the invention, there is provided a network system including at least one image forming device and a managing device that manages at least one image forming devices, at least one image forming devices being provided with a plurality of network interfaces each having identification information intrinsic thereto. Each of the network interfaces may be configured to transmit the identification information intrinsic thereto and other identification information assigned to the other network interfaces belonging to the same image forming device to which the each of the network interfaces belongs. The management device may include an identification information receiving system that receives the identification information transmitted by the plurality of network interfaces, and a judging system that determines whether some of the network interfaces belong to a same image forming device based on all the identification information received by the identification information receiving system.

EMBODIMENT

Hereinafter, referring to the accompanying drawings, an embodiment of the invention will be described in detail. It should be noted that the invention relates to a management of image forming devices. It should be noted that the image forming device may include a printing device or a multi-function device including facsimile function, scanner function, copier function and the like as well as a printer function.

In the following description, as an exemplary embodiment, a network system including a plurality of printing devices are incorporated in an network as well as a terminal device serving as a management device will be described. It should be noted that, in the exemplary embodiment, the maximum number of interfaces included in a single device is two.

Figure 1:
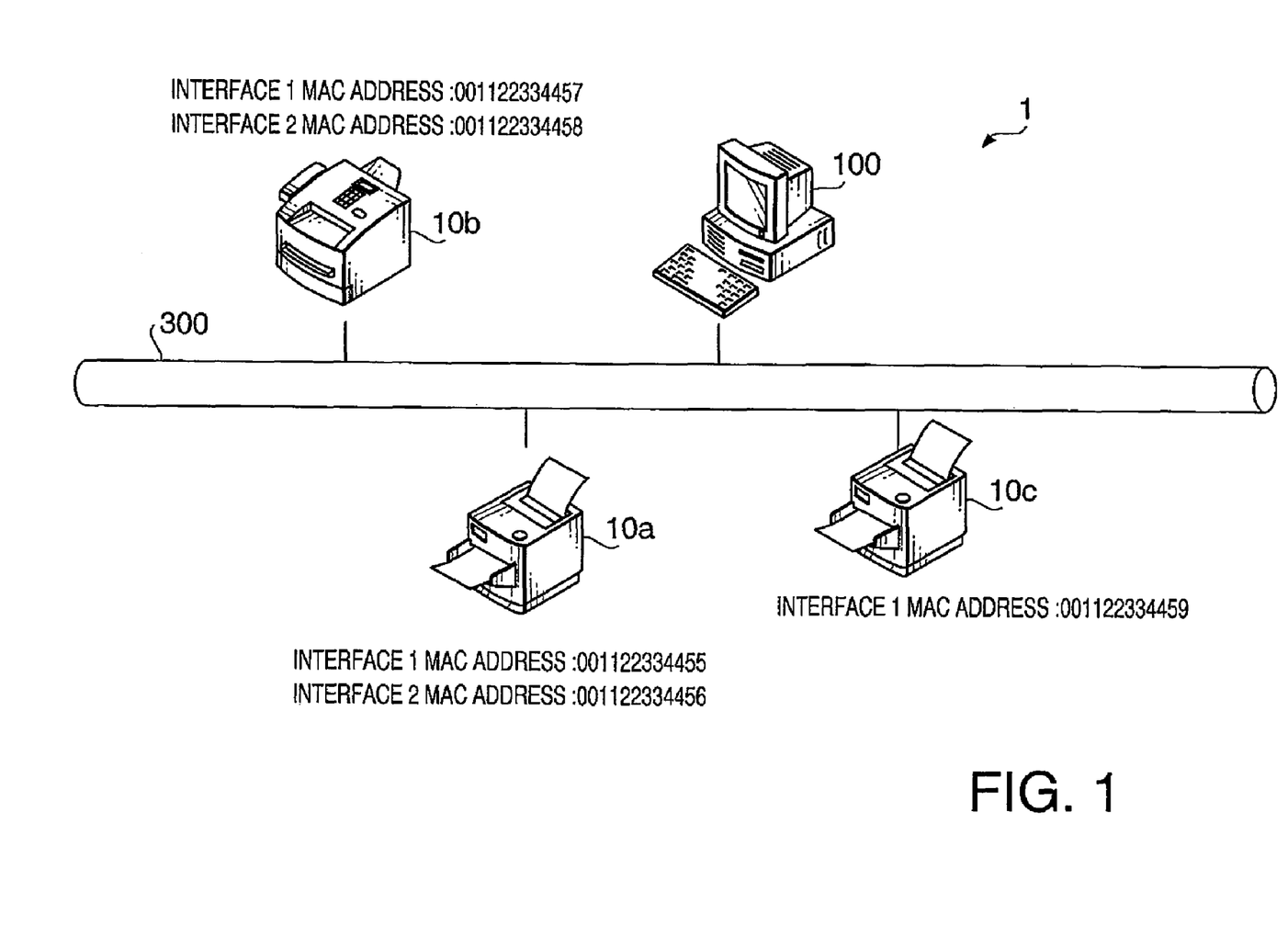
FIG. 1 schematically shows a configuration of a network system according to aspects of the invention.

FIG. 1 schematically shows a configuration of an electronic peripheral device controlling system according to aspects of the invention. A network system 1 shown in FIG. 1 includes a first printing device 10a, a second printing device 10b, a third printing device 10c and image forming devices (not shown), a terminal device (hereinafter, referred to as a management device) 100 that manages the image forming devices (printing devices), which are interconnected with other through a communication network 300.

Among the first, second and third printing devices 10a, 10b and 10c, each of the first printing device 10a and the second printing device 10b has tow network interfaces, and the third printing device 10c has a single network interface. In order to connect to the communication network 300, a serial communication cable, a parallel communication cable, a wired LAN cable and the like can be used. Optionally, a wireless communication is available using a wireless LAN, IEEE 802.11x or Bluetooth®.

Figure 2A:
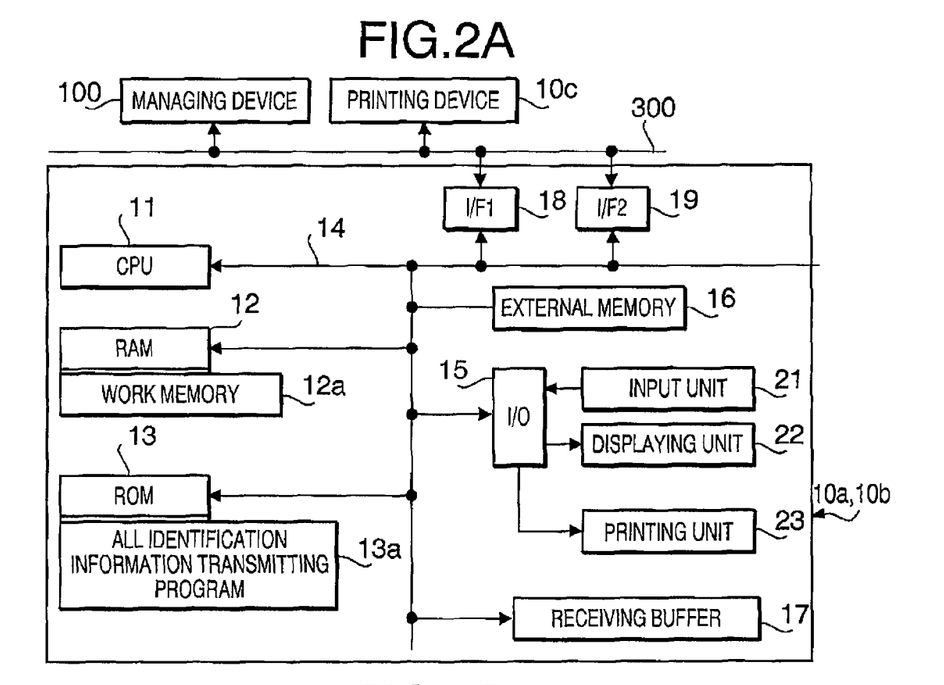
FIG. 2A is a block diagram of a first or second printing device according to aspects of the invention.

FIG. 2A is a block diagram showing a electrical configuration of the printing device 10a (10b). The printing device 10a (10b) includes, as shown in FIG. 10, a CPU (Central Processing Unit) 11, a RAM (Random Access Memory) 12 having a work memory 21a, a ROM (Read Only Memory) 13 storing various programs for execution, a bus line 14, an I/O (input/output) unit 15, a non-volatile external memory 16 (e.g., EEPROM), network interfaces (i.e., I/F in the drawing) 18 and 19 used for connection with the communication network 300 and a reception buffer memory (occasionally referred to as a reception buffer memory 17 for temporarily storing print control data received from the network 300. The I/O unit 15 is connected with a display unit 22 including an LCD (Liquid Crystal Display), an input unit 21 provided with a touch panel, depression switches and ten keys, and a printing unit 23 including a well-known inkjet printing mechanism, a laser printing mechanism, a thermal transfer printing mechanism, and a dot impact printing mechanism.

Figure 2B:
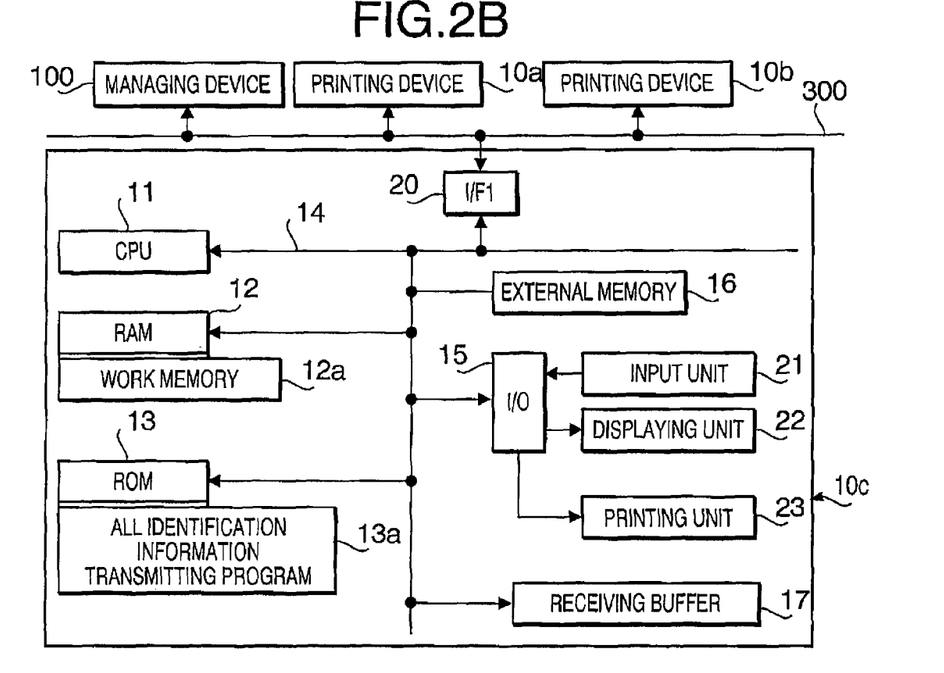
FIG. 2B is a block diagram of a third printing device according to aspects of the invention.

As shown in FIG. 2B, according to the exemplary embodiment, the configuration of the printing device 10c is similar to that of the printing device 10a or 10b except that it has only a single network I/F 20.

The printing devices 10a, 10b and 10c are connected to the network 300 through the network interfaces 18, 19 and 20, respectively. The network interfaces 18, 19 and 20 are provided as LAN cards, respectively, according to the exemplary embodiment. As shown in FIG. 1, each of the network interfaces 18 and 19 of the first printing device 10a is configured such that, in a storage unit (e.g., configured as a PROM allowing a one-time writing), at an appropriate address, MAC addresses "001122334455", "001122334456" etc. are stored. Further, in the network interface 20 of the third printing device 10c, a MAC address "001122334459" is stored. It should be noted that the MAC address is a hardware address that is used for identifying a host in a network. In the Ethernet, an identification code of 48 bits for a NIC (Network Interface Card) is assigned, and is called as an Ethernet address. Among the 48-bit code, a first half (24 bits) is an ID intrinsic to a vender managed by the IEEE (institute of Electrical and Electronic Engineers), and a second half (24 bits) represent a serial number of the NIC. Thus, each MAC address is a number having a plurality of digits, and is unique in the world.

Figure 3:
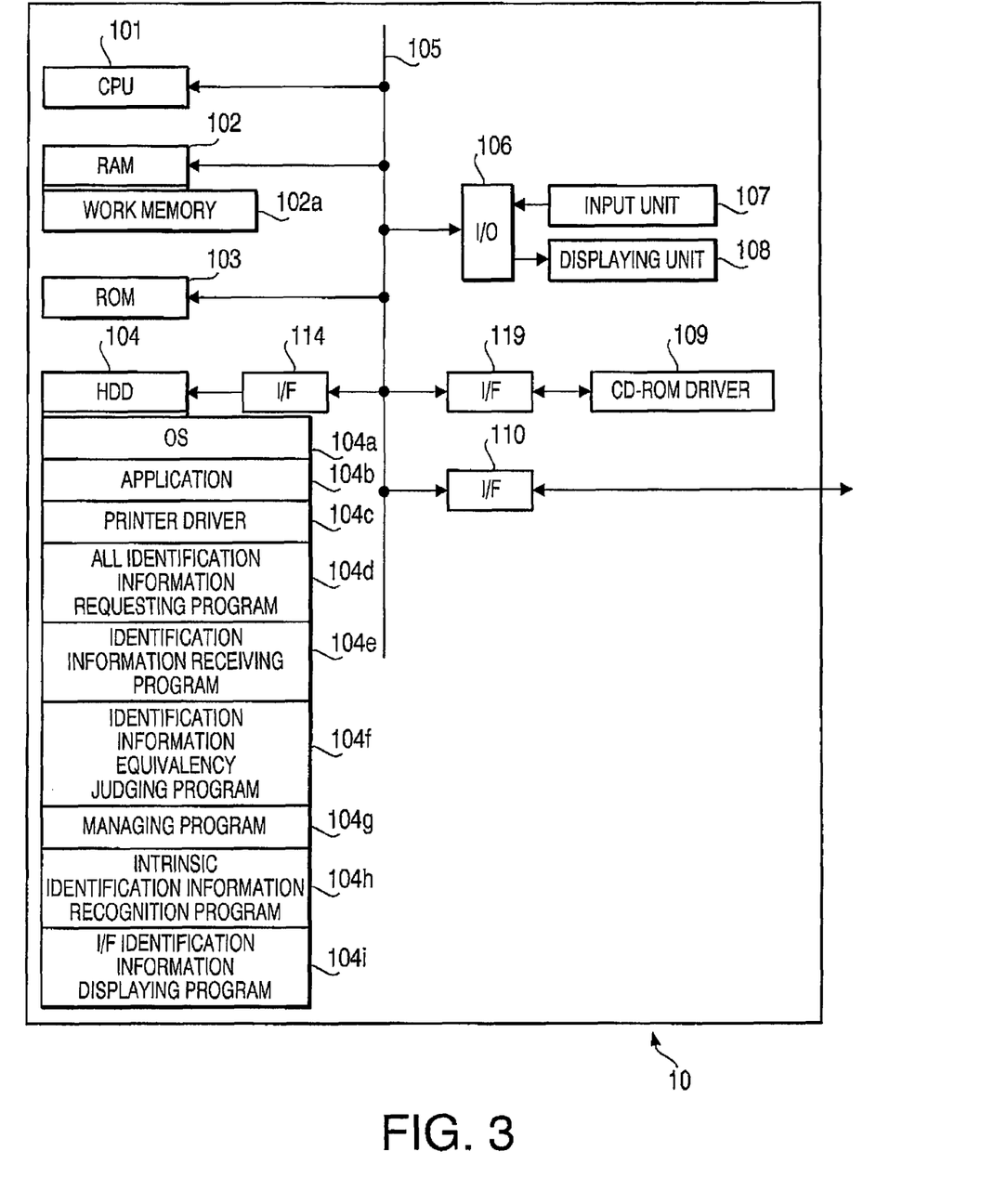
FIG. 3 is a block diagram of a management device according to aspects of the invention.

FIG. 3 is a block diagram of the management device 100 showing an electronic configuration thereof. The management device 100 is a personal computer (or a work station) that includes, a CPU 101, a RAM 102 having a work memory 102a, a ROM 103 storing various programs, an HDD (Hard Disk Drive) 104, a bus line 105, an I/O unit 106, a CD-ROM drive 109, a communication interface 110 to be connected to the communication network 300 and the like.

The HDD 104 and the CD-ROM drive 109 are connected to the bus line 105 through the network interfaces 114 and 119, respectively. In the HDD 104, an OS (Operating System) 104a, various applications 104b having printing functions, a printer driver 104c that executes print control process for controlling the printing devices 10a, 10b and 10c are installed. The HDD 104 also stores temporary print control data which is part of print job data generated by the respective applications 104b and is subjected to the print control process by the printer driver 104c. To the I/O unit 106, an I/O unit 107 including a keyboard and a mouse, and a display unit 108 including an LCD or CRT (Cathode Ray Tube) are connected.

It should be noted that, as the all ID information transmitting program 13a stored in the ROM 13 is executed by the CPU 11, the function of transmitting all the ID information is realized. Further, as the all ID information confirmation requesting program 104d, ID information receiving program 104e, ID information equivalency judging program 104f, management program 104g, intrinsic ID recognition program 104h stored in the HDD 104 are executed by the CPU 101, corresponding functions are realized, respectively. Further, an I/F identifying information displaying program 104i stored in the HDD 104 is a program for displaying the management information obtained form the network interface on the display unit 108.

The all IK information confirmation requesting program 104d, ID information receiving program 104e, ID information equivalency judging program 104f, management program 104g, intrinsic ID recognition program 104h, I/F identification information displaying program 104i may be delivered in the form of a CD-ROM or the like to each user. In such a case, each of the program can be installed in each management device 100 by reading respective program using a CD-ROM drive 109. Alternatively, each program can be installed by downloading the program through the communication network.

The all ID information transmitting program 13a may not be stored in the ROM 13 in advance. For example, the all ID information transmitting program 13a may be retrieved from a CD-ROM (or another recording medium) using the CD-ROM drive 109. Alternatively, the management device may download the program 13a through the communication network 300, transmit the downloaded program 13a to the printing devices 10a-10c and install the program 13a in external memories 16 such as an EEPROM provided to each of the printing devices 10a through 10c.

In the network system 1 configured as above, the management device 100 transmits a network interface confirmation request for checking the existence of network interfaces (e.g., those of the printing devices 10a-10c) to all the network interfaces supposed to be connected with the communication network 300. In response to the request, each of the network interfaces transmit MAC addresses of all the network interfaces of the printing devices 10a through 10c. The management device 100 receives the thus transmitted MAC addresses. The management device 100 can check all the MAC addresses of all the interfaces on the network, and is capable of judging whether different network interfaces belong to the same printing device.

Figure 4A:
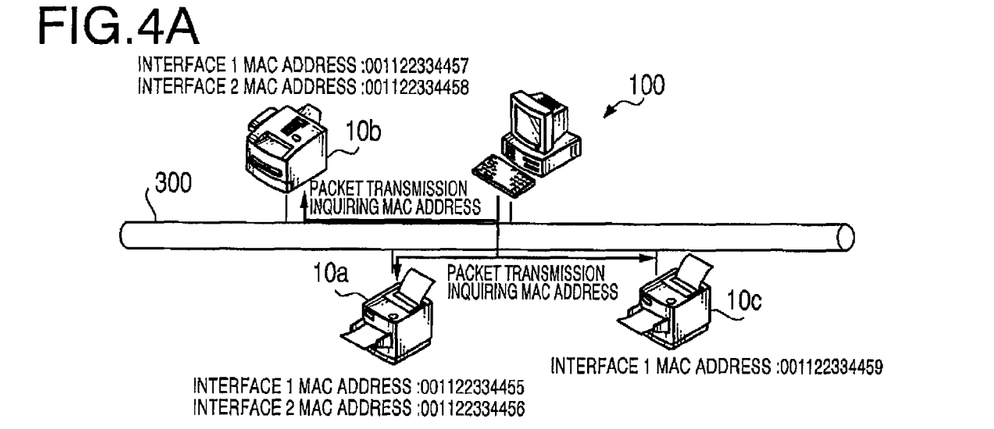
FIGS. 4A-4C show operation of the network system according to aspects of the invention.
Figure 4B:
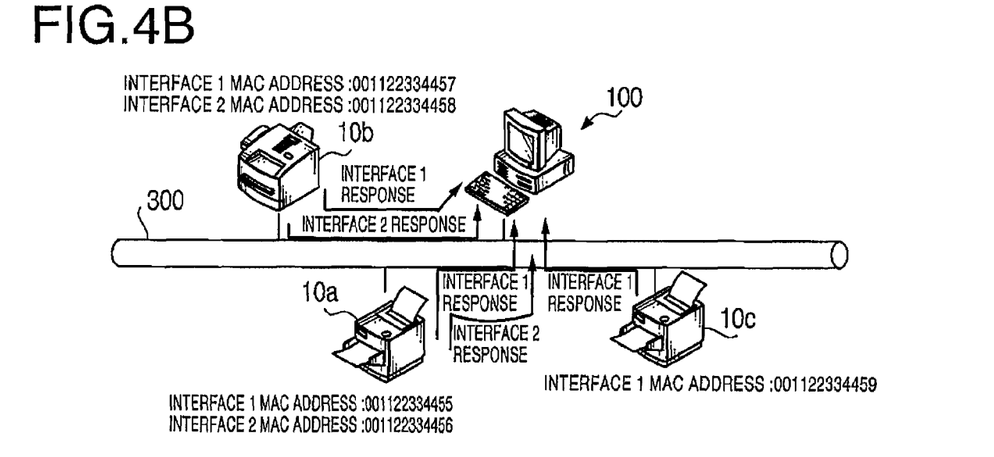
Figure 4C:
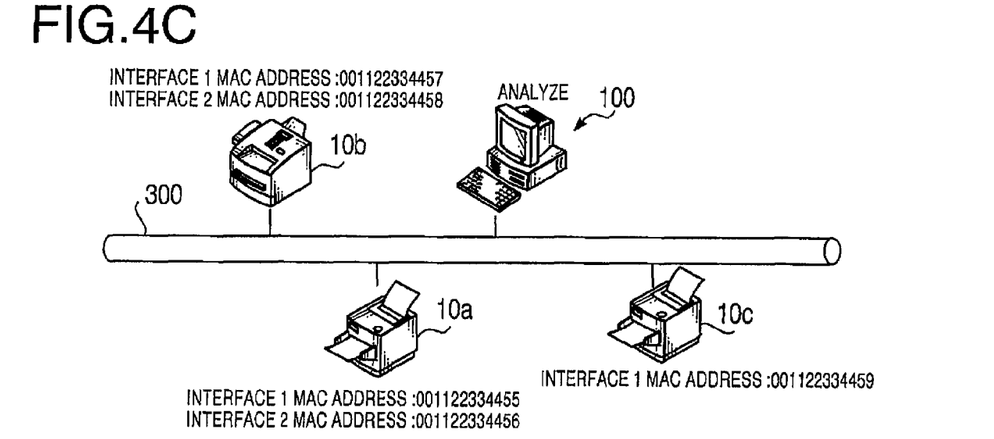

FIGS. 4A-4C show operation of the network system according to aspects of the invention.

First, the management device 100 requests each of the network interfaces of the printing devices 10a through 10c for their MAC addresses. Specifically, the management device 100 firstly requests for the first MAC address. If the management device 100 receives the reply to the request for the first MAC address, the management device 100 requests for a second MAC address. This process will be repeated until transmission of the MAC address from each network interface is ceased (see also FIGS. 4B and 4C).

According to the present embodiment, for example, the printing device 10c has a single network interface. Therefore, the MAC address transmitted from the printing device 10c is only one. Each of the printing devices 10a and 10b has two network interfaces, and transmits two MAC addresses to the management device 100. When the MAC addresses are received, the management device 100 generates a list of the MAC addresses, and analyzes the received MAC addresses. The management device 100 determines the MAC addresses belonging to the interfaces of the same printing device, based on the list generated as above.

Referring to a flowchart shown in FIG. 5 and tables shown in FIGS. 6A, 6B, 7A and 7B, the operation of the management device 100 will be described in detail.

In S1, the management device 100 transmits an SNMP (Simple Network Management Protocol) broadcast to each network interface to check the MAC addresses. At this step, firstly, the management device 100 executes confirmation request for the first identification information. If the management device 100 receives the reply to the request for the first identification information (S2: YES), the management device 100 registers the MAC address with a database to generate a list of the MAC addresses obtained for respective network interfaces (S3). Thereafter, the control returns to S1, and a request for the second identification information is issued (i.e., transmitted as an SNMP broadcast). Until it is determined that no MAC address is received, the above step of checking is repeated. With the above process, all the MAC addresses which can be transmitted by the network interfaces can be checked. It should be noted that, when each network interface transmits its MAC address, management information, which is the information intrinsic to the printing device or the network interface and is used by the management device 100 to manage the printing devices, is also transmitted to the management device 100. The management device 100 categorizes the received management information by network interfaces, and registers the same with the database stored in the HDD 104.

Next, referring to FIGS. 6A and 6B, an example of lists generated by the management device 100 will be described in detail.

Figure 6A:
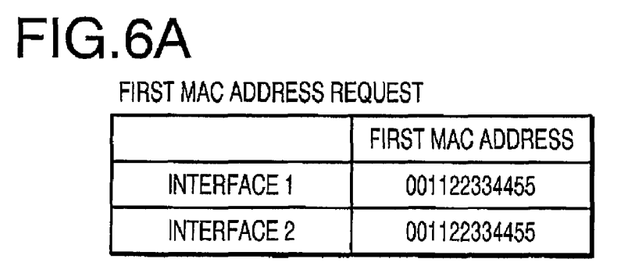
FIGS. 6A-6B show an example of lists generated by the management device according to aspects of the invention.
Figure 6B:
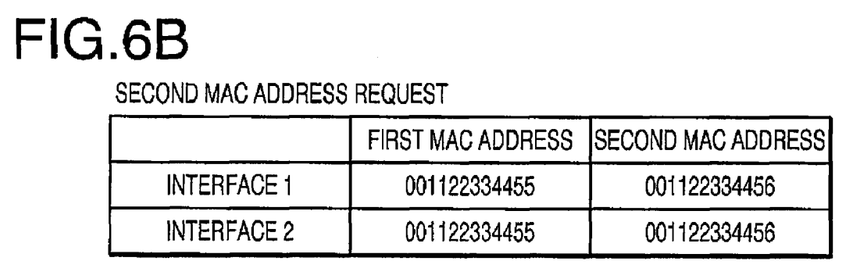

The lists shown in FIGS. 6A and 6B are generated when the MAC address of the network interface 1 of the first printing device 10a is "001122334455" and the MAC address of the network interface 2 of the first printing device 10a is "001122334456". Both the network interfaces 1 and 2 are set such that, when the management device 100 requests for the first MAC address, both the network interfaces 1 and 2 reply the MAC address of "001122334455". Further, both the network interfaces 1 and 2 are set such that, when the management device 100 requests for the second MAC address, both the network interfaces 1 and 2 reply the MAC address of "001122334456". Therefore, after the request for the first MAC address has been issued by the management device 100, the list shown in FIG. 6A is generated. Then, after the request for the second MAC address has been issued, the list shown in FIG. 6B is generated.

The management device 100 judges the equivalency of a combination of the MAC addresses obtained from the network interface 1 (i.e., "001122334455" and "001122334456") and a combination of the MAC addresses obtained from the network interface 2 (i.e., "001122334455" and "001122334456"). That is, the management device 100 judges whether the MAC addresses of the network interface 1 and those of the network interface 2 are the same. In this example shown in FIG. 6B, the combinations are identical, the network interfaces 1 and 2 are considered to belong to the same printing device.

Figure 7A:
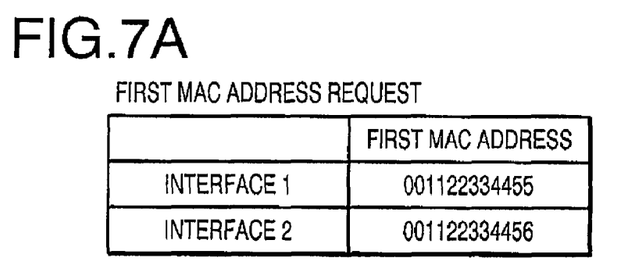
FIGS. 7A-7B show another example of lists generated by the management device according to aspects of the invention.
Figure 7B:
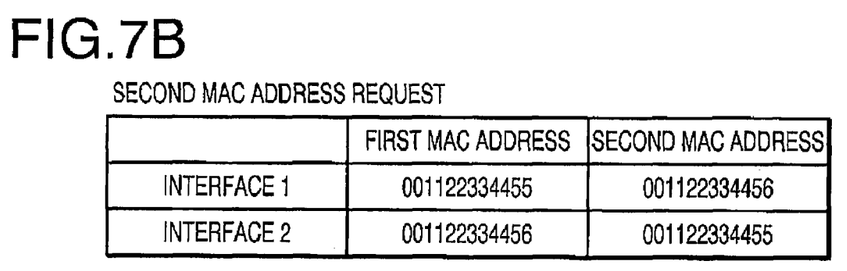

FIGS. 7A and 7B show alternative example of the lists generated by the management device 100. In this example, the network interfaces 1 and 2 are configured such that, when the request for the first MAC addresses is received, the network interfaces 1 and 2 transmit the MAC addresses of themselves, and when the request for the second MAC addresses is received, the network interfaces 1 and 2 transmit the MAC addresses of the other network interfaces. Therefore, when the replies to the first inquiry of the MAC addresses are received, the list shown in FIG. 7A is generated, and when the replies to the second inquiry of the MAC addresses are received, the list shown in FIG. 7B is generated. If it is known that the replies to the first request for the MAC addresses represent the MAC addresses of the network interfaces, from the list shown in FIG. 7B (or FIG. 7A), it is recognized that the MAC address of the network interface 1 is "001122334455" and that of the network interface 2 is "001122334456". This recognition process is executed as the intrinsic ID information recognition program 104h stored in the HDD 104 is executed.

Figure 8:
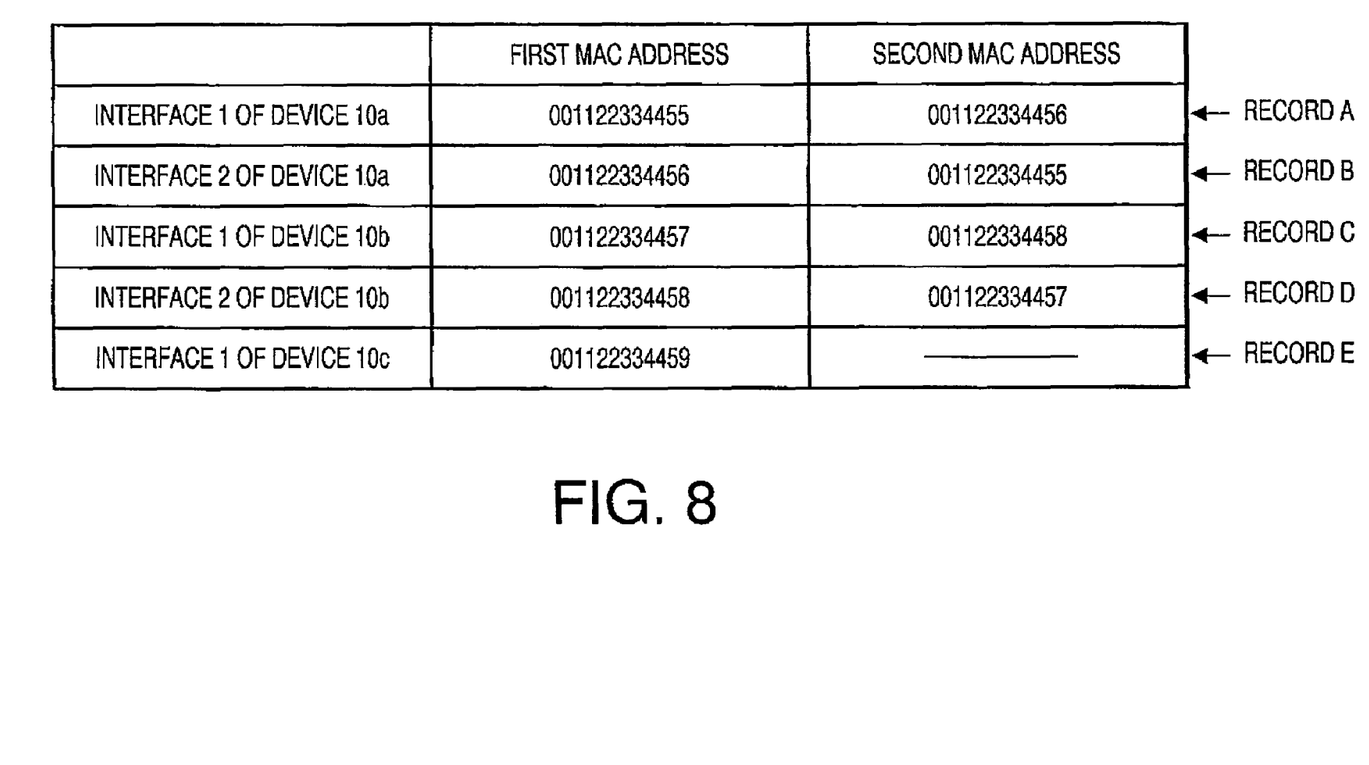
FIG. 8 shows an example of a list including the interfaces of an entire network.

When the three printing devices 10a through 10c are connected to the network 300 as shown in FIG. 1, the MAC addresses of the network interfaces of each of the printing devices 10a, 10b and 10c are transmitted to the management device 100, a list shown in FIG. 8 is generated.

Figure 5:
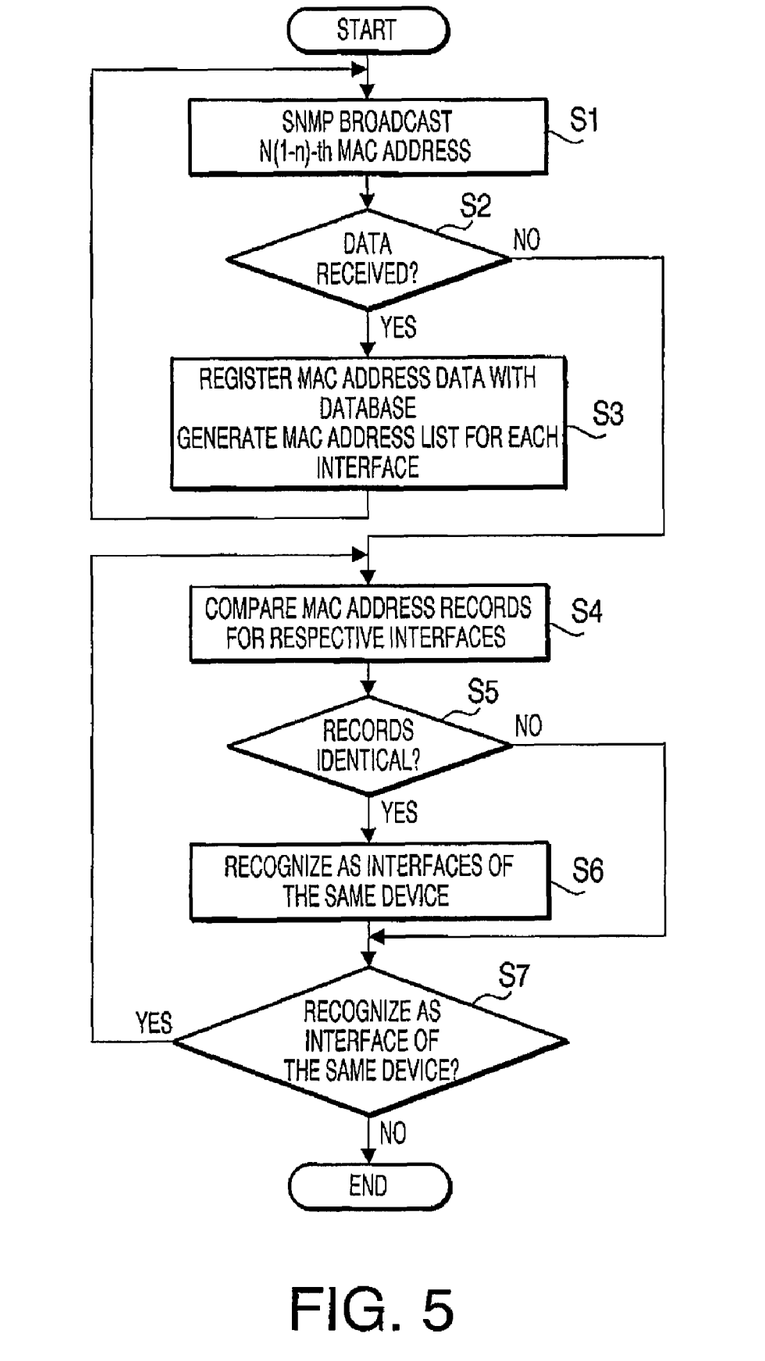
FIG. 5 is a flowchart illustrating a management device according to aspects of the invention.

In FIG. 5, the management device 100 compares the records in the list of the network interfaces. Specifically, for example, the management device 100 compares records A through E of the list shown in FIG. 8. Then, in S5, for example, the management device 100 determines that the combination of the MAC addresses of the record A and the combination of the MAC addresses of the record B are the same (i.e., the equivalency exists). In such a case, the management device 100 proceeds to S6 and determines that the two network interfaces belong to the same printing device (since the combinations of the MAC addresses have equivalency), the stores the determination result in the database stored in the HDD 104.

The management device 100 then proceeds to S7 and judges whether there remain further network interfaces subject to the comparison. In the example of the list shown in FIG. 8, the records C and D have not yet compared. In such a case, the management device goes to step 4 to compare the records C and D. Thereafter, steps S5 and S6 are executed as described previously. In the example shown in FIG. 8, after the above comparison, only the record E remains. Then, the management device 100 determines that there is no records to be compared and finishes the process shown in FIG. 5.

As above, by executing steps S5 through S7, the management information for managing each printing device can be stored in the database on the HDD 104 in association with the information indicating which network interfaces belong to which printing devices.

Figure 9:
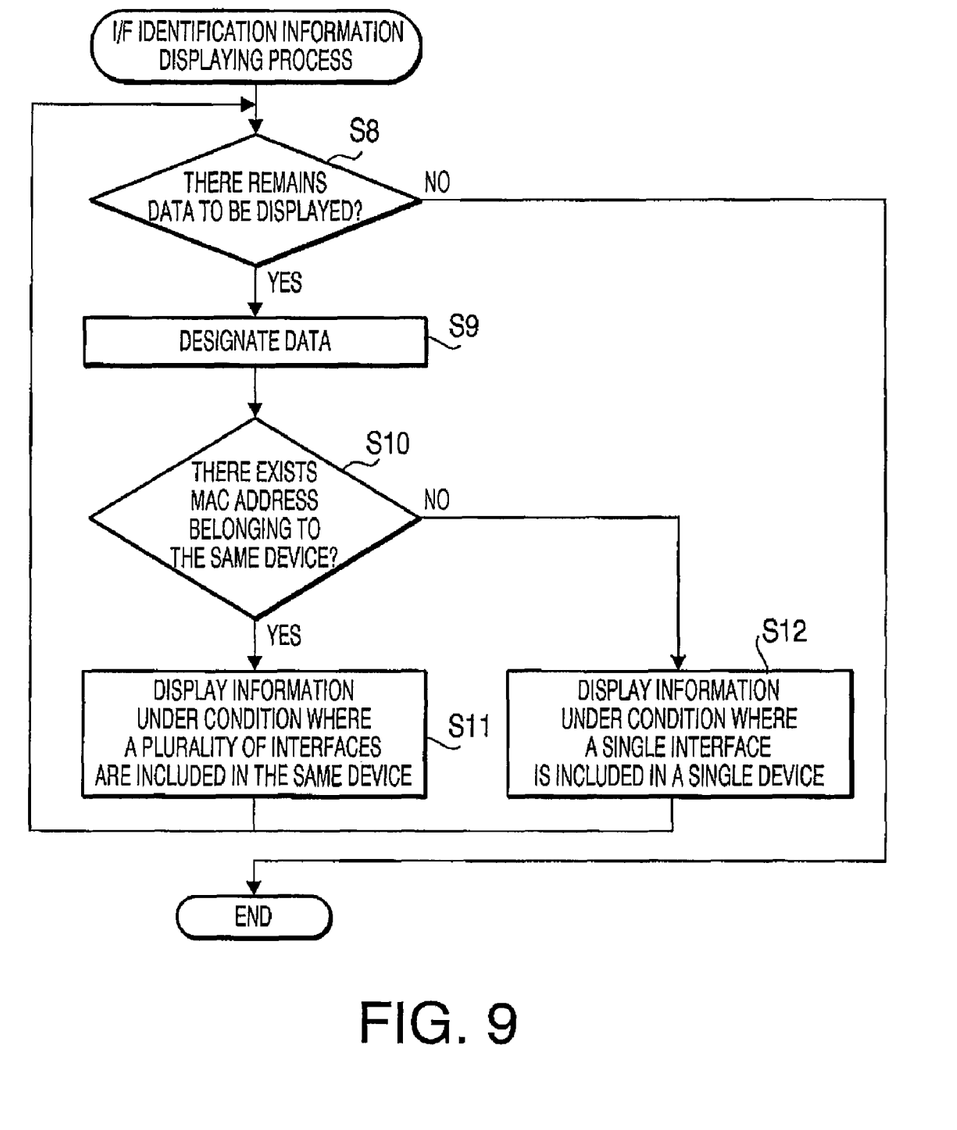
FIG. 9 is a flowchart illustrating an IF (interface) identification information display process according to aspects of the invention.

When steps S5 through S7 have been finished, the I/F identification information displaying program 104i shown in FIG. 9 is started automatically (or in response to operation by the user) to display the management information on the display unit 108.

FIG. 9 is a flowchart illustrating an I/F identification information display process. when the I/F identification information displaying process is started, in S8, the management device 100 judges whether the management information to be displayed is stored in the HDD 104. If there is no management information to be displayed (S8: NO), the management device 100 finishes the I/F identification information displaying program 104i. If there is information to be displayed (S8: YES), the management device 100 proceeds to S9. In S9, the CPU 101 designate on piece of the management information among the information in the database of the HDD 104. In S10, the management device 100 checks whether there is another MAC address belonging to the designated network interface. If there is a further MAC address (S10: YES), the management device 100 proceeds to S11, and displays the management information on the display unit 108 so that the user can recognize that a plurality of network interfaces are included in the single printing device. If there is no more MAC address (S10: NO), the management device 100 proceeds to S12, and displays the management information on the display unit 108 so that the user can recognize that only a single interfaces is included in the single printing device.

After displaying the information above, the management process returns to S8, judges whether availability of the MAC addresses that have not yet been displayed, and repeats the process until all the management information is displayed.

Figure 10:
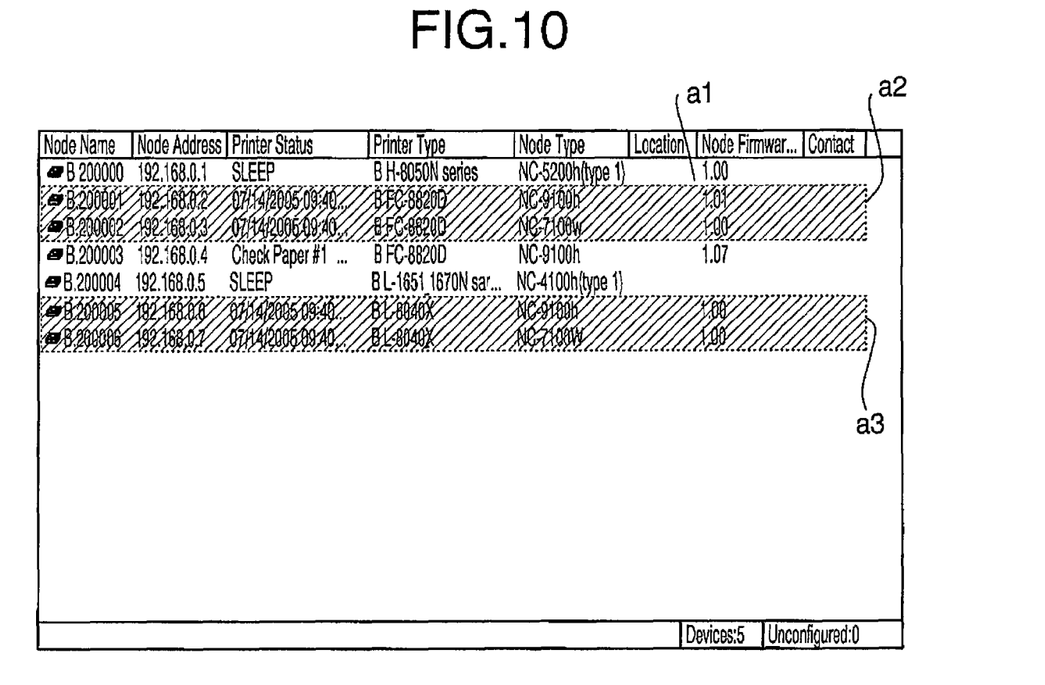
FIG. 10 shows an example of management information.

FIG. 10 shows an example of a screen image of the display unit 108 when the management information is displayed. In this example, the management information is displayed as a list. The printing device provided with a single network interface is displayed to have a single line (a1), while printing devices provided with a plurality of network interfaces are displayed to have consecutive lines (see a2 and a3). In this example, the consecutive lines corresponding to the same printing device are surrounded by broken lines so that user can recognize that a plurality of network interfaces belong to the same printing device. Since a plurality of network interfaces are grouped and listed, the user can recognize that the plurality of network interfaces belong to a single printing device, or not.

Figure 11A:
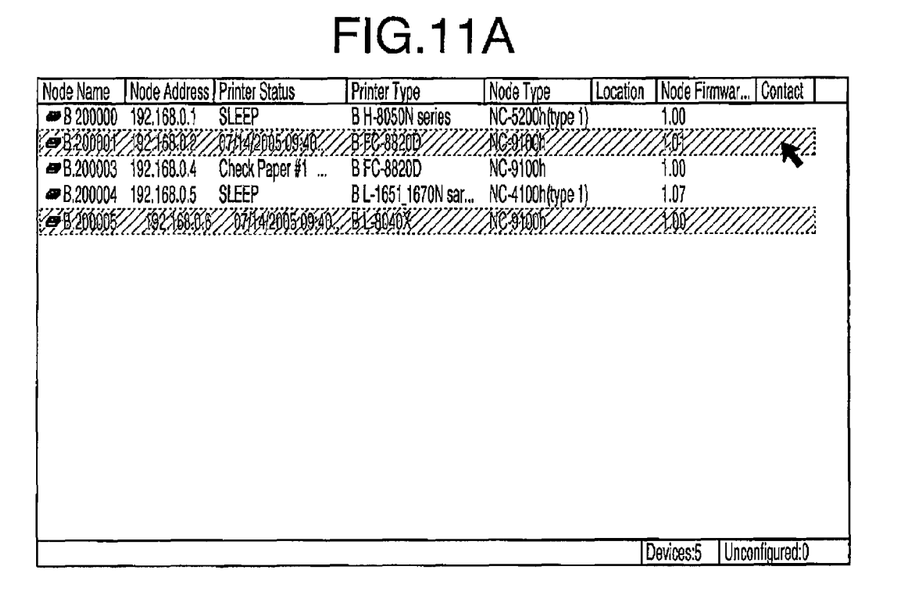
FIGS. 11A and 11B show examples of the management information.
Figure 11B:
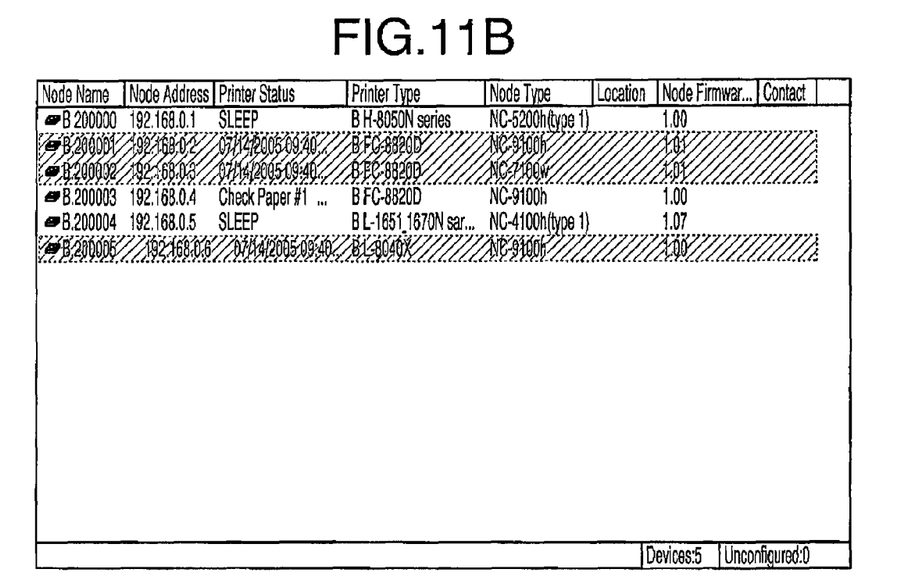

FIGS. 11A and 11B show another example of the display of the management information. In this example, in a normal state, even if the printing device is provided with a plurality of network interfaces, only one network interface is displayed for one printing device (or image forming device) as shown in FIG. 11A. When the user clicks a line corresponding to the printing device provided with a plurality of network interfaces, all the network interfaces for the printing device are displayed as shown in FIG. 11B. Alternatively, without increasing the number of lines, a displayed information (i.e., Node name, Node address, etc.) of the network interface may be switched in response to a click of the line corresponding to the printing device provided with a plurality of network interfaces. In such a case, for example, a single-click may switch the display and a double-click may select the displayed interface. It is preferable that, similar to the example shown in FIG. 10, printing devices provided with a plurality of network interfaces are displayed to be surrounded by broken lines so that the user can recognize that the printers are provided with a plurality of network interfaces.

Figure 12A:
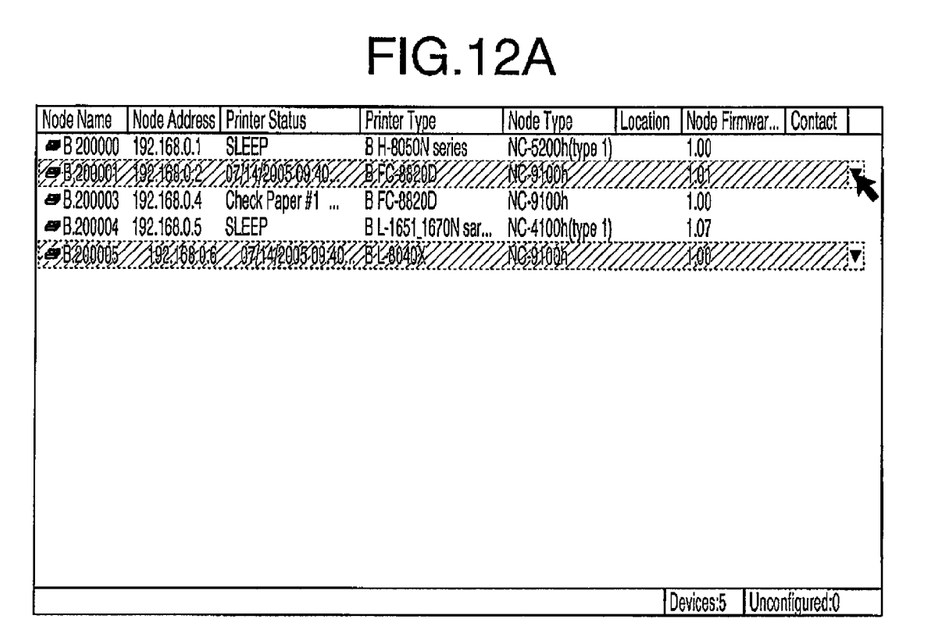
FIGS. 12A and 12B show further examples of the management information.
Figure 12B:
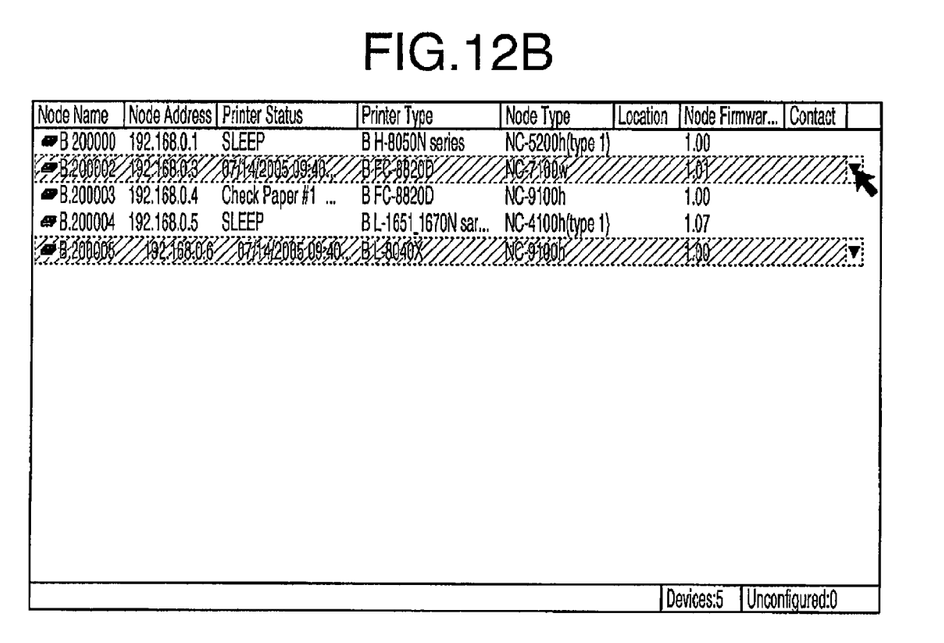

FIGS. 12A and 12B show a further example of the display of the management information. In this example, at the right-hand side end of the line corresponding to the printing device provided with a plurality of network interfaces, a predetermined button (mark) is displayed. When the user clicks the predetermined button (mark), the display on the line scrolls (i.e., the display is replaced with information on another network interface) as shown in FIG. 12B.

Figure 13:
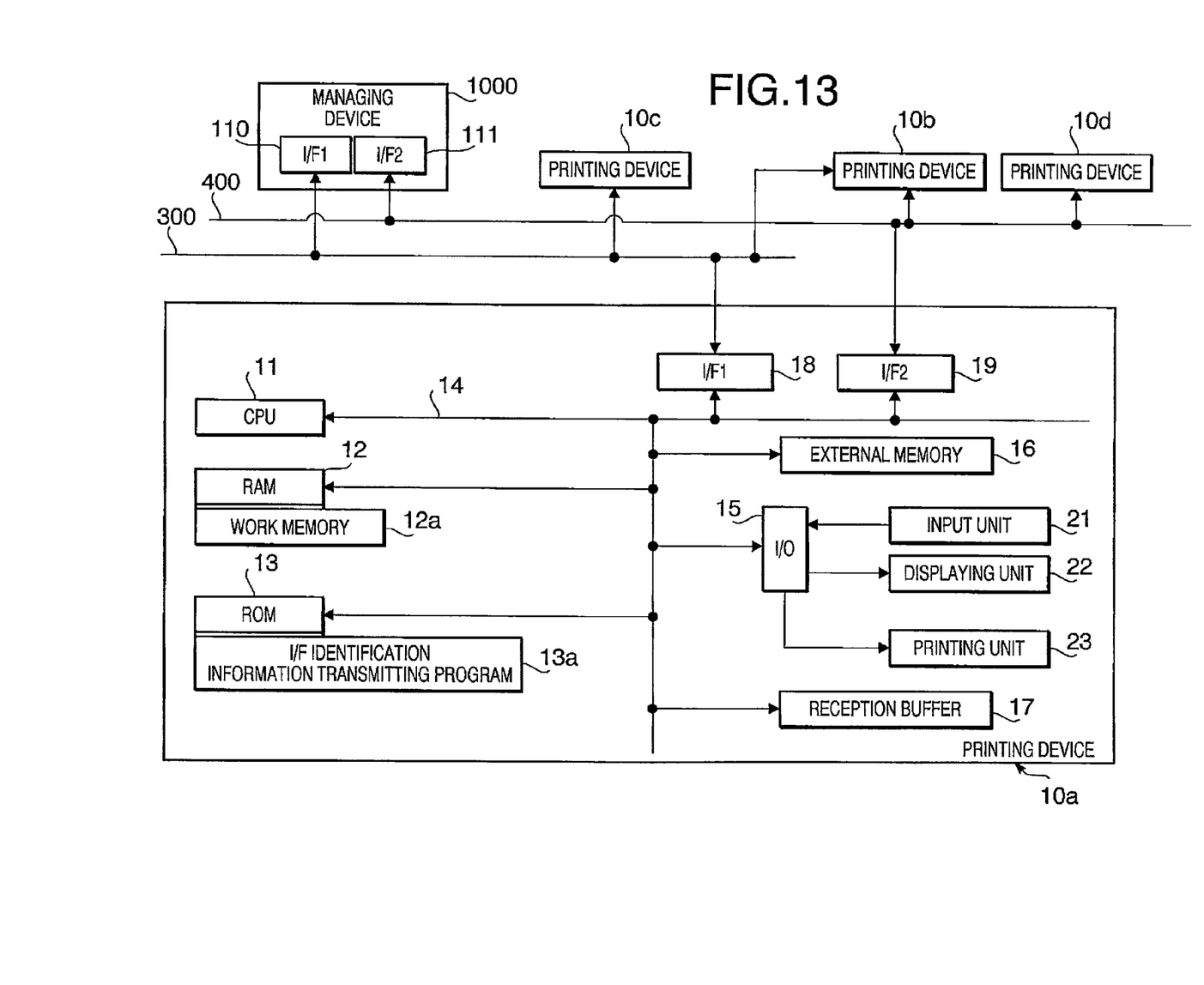
FIG. 13 is a block diagram of the management device and the printing device connected to a plurality of networks.

In the above-described embodiment, the management device 100 is connected to a single network 300. The invention needs not be limited to such a configuration, and the management device 100 may be connected to a plurality of networks and manages network interfaces on the plurality of networks. FIG. 13 is a block diagram of such a management device 1000 connected to a plurality of networks 300 and 400. In this embodiment, four image forming devices 10a, 10b, 10c and 10d are connected to one or both of the networks 300 and 400. In this example, the management device 1000 is similar to the management device 100 described above except that the management device 1000 is provided with a second network interface 111 connected to the network 400 in addition to the network interface 110 connected to the network 300. The printing devices 10a and 10b are provided with a plurality of network interfaces 18 and 19 which are connected to the networks 300 and 400, respectively. In this case, the MAC addresses transmitted from the network interfaces 18 and 19 of each of the printing devices 10a and 10b are transmitted to the management device 1000 through different networks 300 and 400. The management device 1000 is capable of judging the equivalency for all the MAC addresses received through both the network interfaces 110 and 111. Therefore, even if the MAC addresses are received through different networks, they are subjected to the judgment, if it is determined that two MAC addresses received through different networks are identical, it is known that the network interfaces corresponding to the identical MAC addresses belong to the same printing device, and the centralized management can be done.

It should be noted that the invention needs not be limited to the configurations described above, and can be modified in various ways without departing from aspects of the invention. For example, in the above configurations, the MAC addresses are referred to as identification information. However, any information intrinsic to each network interface can be used as the identifying information.

What is claimed is:

1. A managing device connected to an image forming device through a network, the image forming device being provided with a plurality of network interfaces to which identification information intrinsic to each of the plurality of network interfaces is assigned, the managing device comprising:

an identification information requesting unit configured to request each of the plurality of network interfaces for the identification information of all the network interfaces belonging to the image forming device via the network, wherein the identification information assigned to each network interface comprises a MAC address for identifying the image forming device on the network;

an identification information receiving unit configured to receive reply information transmitted from the each of the plurality of network interfaces in response to the identification information request;

an identification information equivalency judging unit configured such that, when the identification information receiving unit receives the identification information from each of the plurality of network interfaces, the identification information equivalency judging unit judges whether a particular combination of the MAC addresses received from a particular network interface is identical to a further combination of the MAC addresses received from a further network interface; and a managing unit configured such that, when the identification information equivalency judging unit determines that the particular combination of the MAC addresses is identical to the further combination of the MAC addresses, the managing unit manages the particular network interface and the further network interface as belonging to the same image forming device.

2. The managing device according to claim 1, further comprising:

an identification information recognition unit configured to recognize the identification information of the network interface that transmits the identification information by discriminating the identification information on the network interface that transmits the identification information from the identification information on the other network interfaces provided to the image forming device, wherein, when the identification information equivalency judging unit determines that the combinations of the MAC addresses received from the particular network interface and the further network interface are identical to each other, the managing unit manages the particular network interface and the further network interface as belonging to the same image forming device, the managing unit recognizing and managing the identification information on each network interface.

3. The managing device according to claim 1, wherein the identification information requesting unit is configured to request the individual network interfaces for the identification information of the network interfaces belonging to the image forming device.

4. A network system including an image forming device provided with a plurality of network interfaces respectively assigned with a plurality of pieces of identification information intrinsic to the plurality of network interfaces, respectively, and a managing device connected through a network, wherein each of the plurality of pieces of identification information comprises a MAC address for identifying the image forming device on the network, wherein the image forming device comprises an identification information transmitting unit that transmits, in response to a request from the managing device, all of the plurality of pieces of the identification information from a requested one of the plurality of network interfaces, wherein the managing device comprises:

an identification information requesting unit configured to request each of the plurality of network interfaces for the identification information of all the network interfaces belonging to the image forming device via the network;

an identification information receiving unit configured to receive the identification information transmitted from each of the plurality of network interfaces in response to the identification information request;

an identification information equivalency judging unit configured such that, when the identification information receiving unit receives the plurality of pieces of the identification information from each of the plurality of network interfaces, the identification information equivalency judging unit judges whether a particular combination of the plurality of pieces of the identification information received from a particular network interface is identical to a further combination of the plurality of pieces of the identification information received from a further network interface; and a managing unit configured such that, when the identification information equivalency judging unit determines that the particular combination of the MAC addresses received from the particular network interface is identical to the further combination of the MAC addresses received from the further network interface, the managing unit manages the particular network interface and the further network interface as ones belonging to the same image forming device.

5. The network system according to claim 4, wherein the identification information transmitting unit is configured to transmit the plurality of pieces of the identification information individually from the plurality of network interfaces, and wherein the identification information requesting unit is configured to request the individual network interfaces for the identification information of the network interfaces belonging to the image forming device.

6. A computer-accessible, non-transitory recording medium storing a program containing instructions that cause a computer to control a managing device connected to an image forming device through a network, the image forming device being provided with a plurality of network interfaces to which identification information intrinsic to each of the plurality of network interfaces is assigned, the program including a computer executable instructions of:

requesting each of the plurality of network interfaces for the identification information of all the network interfaces belonging to the image forming device via the network, wherein the identification information assigned to each network interface comprises a MAC address for identifying the image forming device on the network;

receiving the identification information transmitted from the each of the plurality of network interfaces in response to the identification information request;

judging, when the identification information of the plurality of network interfaces is received from each of the plurality of network interfaces, whether a particular combination of the MAC addresses received from a particular network interface is identical to a further combination of the MAC addresses received from a further network interface; and managing, when the particular combination of the MAC addresses is determined to be identical to the further combination of the MAC addresses, the particular network interface and the further network interface as belonging to the same image forming device.

7. A network system including at least one image forming device and a managing device that manages at least one image forming device, at least one image forming device being provided with a plurality of network interfaces each having identification information intrinsic thereto, wherein the identification information provided to each network interface comprises a MAC address for identifying the image forming device on the network, wherein each of the network interfaces is configured to transmit the identification information intrinsic thereto and other identification information assigned to the other network interfaces belonging to the same image forming device, wherein the management device includes:

an identification information receiving system that receives the identification information transmitted by the plurality of network interfaces; and a judging system that determines whether some of the network interfaces belong to a same image forming device based on a comparison of all the MAC addresses received by the identification information receiving system.

\* \* \* \* \*